US010235092B1

(12) United States Patent
Natanzon et al.

(10) Patent No.: US 10,235,092 B1
(45) Date of Patent: Mar. 19, 2019

(54) INDEPENDENT PARALLEL ON DEMAND RECOVERY OF DATA REPLICAS IN A STORAGE SYSTEM

(71) Applicant: EMC IP Holding Company, LLC, Hopkinton, MA (US)

(72) Inventors: Assaf Natanzon, Tel Aviv (IL); Leehod Baruch, Rishon Leziyon (IL); Ron Bigman, Holon (IL); Amit Lieberman, Raanana (IL); Jehuda Shemer, Kfar Saba (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 134 days.

(21) Appl. No.: 15/380,033

(22) Filed: Dec. 15, 2016

(51) Int. Cl.
*G06F 12/14* (2006.01)
*G06F 3/06* (2006.01)
*G06F 21/56* (2013.01)

(52) U.S. Cl.
CPC ............ *G06F 3/065* (2013.01); *G06F 3/0619* (2013.01); *G06F 3/0665* (2013.01); *G06F 3/0683* (2013.01); *G06F 21/563* (2013.01); *G06F 2221/033* (2013.01)

(58) Field of Classification Search
CPC ................................ G06F 3/065; G06F 21/563
USPC .......................................................... 711/162
See application file for complete search history.

(56) References Cited

U.S. PATENT DOCUMENTS

| 7,203,741 | B2 | 4/2007 | Marco et al. |
| 7,719,443 | B1 | 5/2010 | Natanzon |
| 7,840,536 | B1 | 11/2010 | Ahal et al. |
| 7,840,662 | B1 | 11/2010 | Natanzon |
| 7,844,856 | B1 | 11/2010 | Ahal et al. |
| 7,860,836 | B1 | 12/2010 | Natanzon et al. |
| 7,882,286 | B1 | 2/2011 | Natanzon et al. |
| 7,934,262 | B1 | 4/2011 | Natanzon et al. |
| 7,958,372 | B1 | 6/2011 | Natanzon |
| 8,037,162 | B2 | 10/2011 | Marco et al. |
| 8,041,940 | B1 | 10/2011 | Natanzon et al. |
| 8,060,713 | B1 | 11/2011 | Natanzon |
| 8,060,714 | B1 | 11/2011 | Natanzon |
| 8,103,937 | B1 | 1/2012 | Natanzon et al. |
| 8,108,634 | B1 | 1/2012 | Natanzon et al. |
| 8,214,612 | B1 | 7/2012 | Natanzon |
| 8,250,149 | B2 | 8/2012 | Marco et al. |
| 8,271,441 | B1 | 9/2012 | Natanzon et al. |
| 8,271,447 | B1 | 9/2012 | Natanzon et al. |
| 8,332,687 | B1 | 12/2012 | Natanzon et al. |
| 8,335,761 | B1 | 12/2012 | Natanzon |
| 8,335,771 | B1 | 12/2012 | Natanzon et al. |
| 8,341,115 | B1 | 12/2012 | Natanzon et al. |
| 8,370,648 | B1 | 2/2013 | Natanzon |
| 8,380,885 | B1 | 2/2013 | Natanzon |
| 8,392,680 | B1 | 3/2013 | Natanzon et al. |
| 8,429,362 | B1 | 4/2013 | Natanzon et al. |
| 8,433,869 | B1 | 4/2013 | Natanzon et al. |
| 8,438,135 | B1 | 5/2013 | Natanzon et al. |

(Continued)

*Primary Examiner* — Jae U Yu

(74) *Attorney, Agent, or Firm* — Daly, Crowley Mofford & Durkee, LLP

(57) ABSTRACT

Described embodiments provide devices, systems and methods for operating a storage system. An object store located at the replication site stores data objects associated with data stored in storage of the production site. The replication site may generate a plurality of points in time (PITs) from the data objects and identify a PIT from the plurality of PITs.

19 Claims, 9 Drawing Sheets

(56) References Cited

U.S. PATENT DOCUMENTS

| | | |
|---|---|---|
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |

(56) References Cited

U.S. PATENT DOCUMENTS

| | | |
|---|---|---|
| 9,875,042 B1 | 1/2018 | Natanzon et al. |
| 9,875,162 B1 | 1/2018 | Panidis et al. |
| 2003/0191916 A1* | 10/2003 | McBrearty .......... G06F 11/1464 |
| | | 711/162 |

* cited by examiner

100

100'

306''

308'

600

INDEPENDENT PARALLEL ON DEMAND RECOVERY OF DATA REPLICAS IN A STORAGE SYSTEM

BACKGROUND

A storage system may include a production site having a plurality of storage devices (e.g., storage arrays) to provide data storage. The storage system may include data protection systems that back up production site data by replicating production site data on a backup storage system. The backup storage system may be situated in the same physical location as the production storage system, or in a physically remote (e.g., virtual or cloud) location. The production site data may be replicated on a periodic basis and/or may be replicated as changes are made to the production site data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a storage system that includes a production site and a replication site. An object store located at the replication site stores data objects associated with data stored in storage, e.g., logical units or virtual disks, of the production site. The replication site generates a plurality of points in time (PITs) from the data objects and identifies a PIT from the plurality of PITs.

Another aspect provides a method for operating a storage system that includes a production site and a cloud replication site. The method includes generating an object store located at the cloud replication site. The object store stores data objects associated with data stored in storage, e.g., logical units or virtual disks, of the production site. A plurality of points in time (PITs) are generated from the data objects to identify a PIT from the plurality of PITs.

Another aspect provides a computer program product including a non-transitory computer readable storage medium having computer program code encoded thereon that when executed on a processor of a computer causes the computer to operate a storage system. The storage system includes a production site and a cloud replication site. The computer program product includes computer program code for generating an object store located at the cloud replication site. The object store stores data objects associated with data stored in storage, e.g., logical units or virtual disks, of the production site. The computer program product also includes computer program code for generating a plurality of points in time (PITs) from the data objects and identifying a PIT from the plurality of PITs.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or data write request. In some embodiments, the term "storage system" may encompass physical computing systems, cloud or virtual computing systems, or a combination thereof. In some embodiments, the term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). In some embodiments, the term "storage device" may also refer to a storage array including multiple storage devices.

Figure 1A:
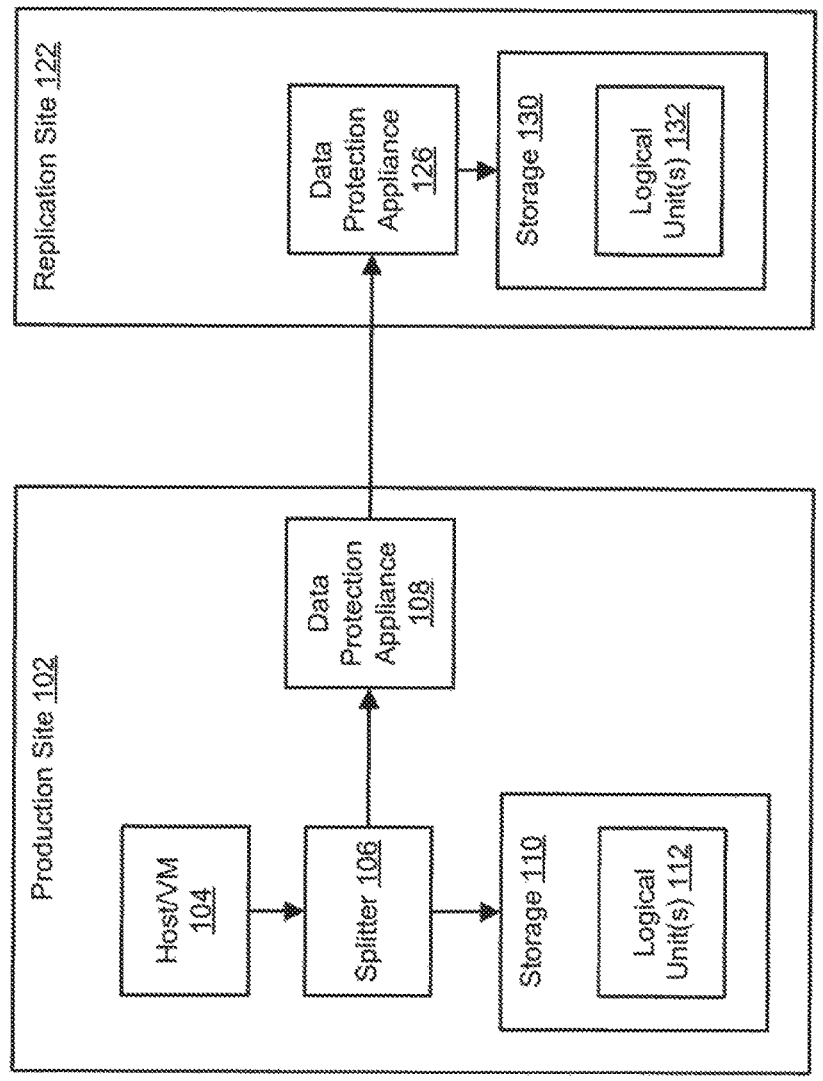
FIG. 1A is a block diagram of a data protection system, in accordance with a first illustrative embodiment.

Referring to the illustrative embodiment shown in FIG. 1A, data protection system 100 may include two sites, production site 102 and replication site 122. Production site 102 may generally be a facility where one or more hosts run data processing applications that write data to a storage system and read data from the storage system. Replication site 122 may generally be a facility where replicated production site data is stored. In such embodiments, production site 102 may back up (e.g., replicate) production data at replication site 122. In certain embodiments, production site 102 and replication site 122 may be remote from one another. For example, as shown in FIG. 1B, replication site 122' may be implemented as one or more "virtual" or "cloud" replication sites located remotely from production site 102' and in communication via a network link (e.g., the Internet, etc.).

Replication site 122 may replicate production site data and enable rollback of data of production site 102 to an earlier point in time (PIT). Rollback may be used in the event of data corruption of a disaster, or alternatively in order to view or to access data from an earlier point in time.

Figure 1B:
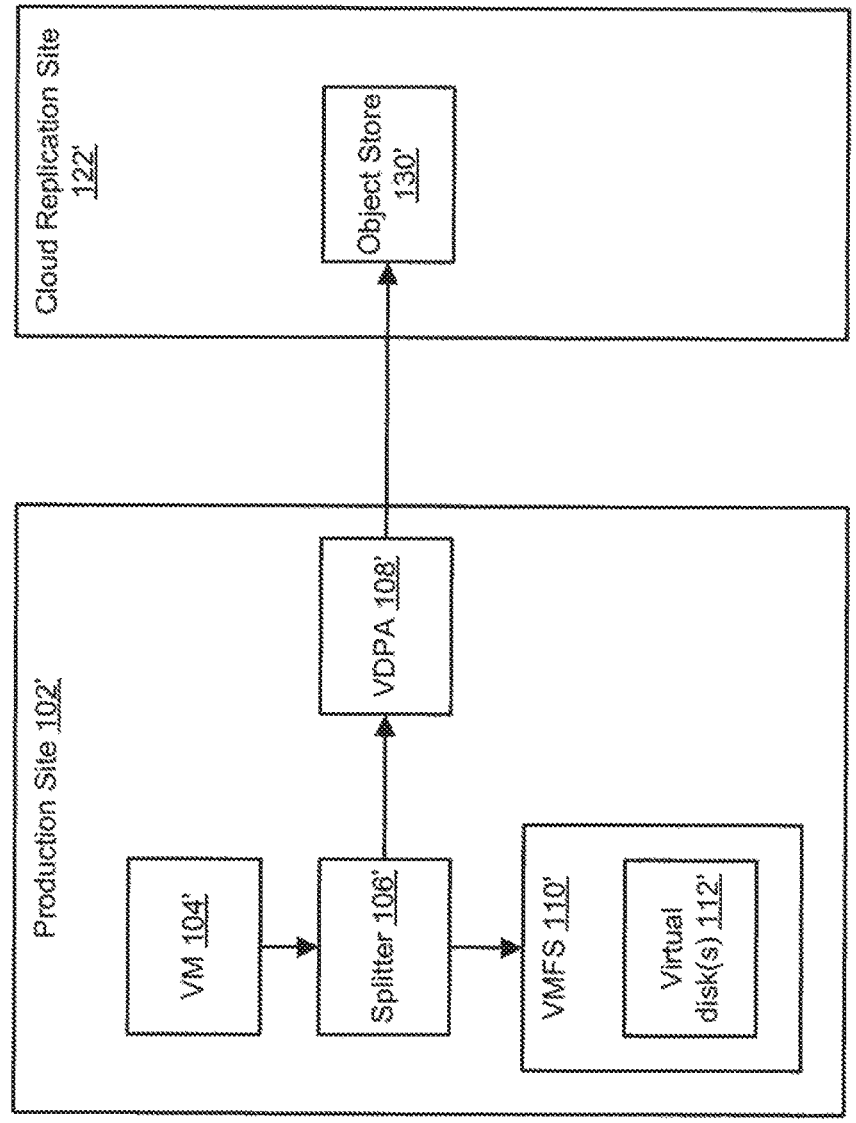
FIG. 1B is a block diagram of a data protection system, in accordance with a second illustrative embodiment.

As shown in FIGS. 1A and 1B, production site 102 may include a host (FIG. 1A) or virtual machine (VM) (FIG. 1B) 104, splitter 106, storage (or storage array) 110, and a data protection appliance (DPA) 108. In some embodiments, host 104 may write to a logical unit in storage 110. In embodiments such as shown in FIG. 1B, VM 104' may write to virtual disk(s) 112' in a virtual machine file system (VMFS) 110'. Replication site 122 may include DPA 126 and storage 130. In some embodiments, host 104 may include one or more devices (or "nodes") that may be designated an "initiator," a "target", or both, coupled by communication links appropriate for data transfer, such as an InfiniBand (IB) link or Fibre Channel (FC) link, and/or a network, such as an Ethernet or Internet (e.g., TCP/IP) network that may employ, for example, the iSCSI protocol.

Storage 110 and storage 130 may include storage devices for storing data, such as disks or arrays of disks. Storage 110 may provide (e.g., expose) one or more logical units (LUs) 112 to which production commands are issued, while storage 130 may provide (e.g., expose) one or more logical units (LUs) 132 to which replication commands are issued. As described herein, an LU is a logical entity provided by a storage system for accessing data stored therein. In some embodiments, a logical unit may be a physical logical unit or a virtual logical unit, and may be identified by a unique logical unit number (LUN).

In some embodiments, DPA 108 and DPA 126 may perform various data protection services, such as data replication of storage system 100, and journaling of I/O requests issued by device 104. DPA 108 and DPA 126 may also enable rollback of production data in storage 110 to an earlier point-in-time (PIT) from replica data stored in storage 130, and enable processing of rolled back data at the target site. In some embodiments, each DPA 108 and DPA 126 may be a physical device, a virtual device, or may be a combination of a virtual and physical device.

In some embodiments, DPA 108 may be receive commands (e.g., SCSI commands) issued by device 104 to LUs 112. For example, splitter 106 may intercept commands from device 104, and provide the commands to storage 110 and also to DPA 108. Splitter 106 may act on intercepted SCSI commands issued to a logical unit in one of the following ways: send the SCSI commands to its intended LU; redirect the SCSI command to another LU; split the SCSI command by sending it first to DPA 108 and, after DPA 108 returns an acknowledgement, send the SCSI command to its intended LU; fail a SCSI command by returning an error return code; and delay a SCSI command by not returning an acknowledgement to the respective host. In some embodiments, splitter 106 may handle different SCSI commands, differently, according to the type of the command. For example, in some embodiments, a SCSI command inquiring about the size of a certain LU may be sent directly to that LU, whereas a SCSI write command may be split and sent to DPA 108.

In certain embodiments, splitter 106 and DPA 126 may be drivers located in respective host devices of production site 102 and replication site 122. Alternatively, in some embodiments, a protection agent may be located in a fiber channel switch, or in any other device situated in a data path between host/VM 104 and storage 110. In a virtualized environment, the protection agent may run at the hypervisor layer or in a virtual machine providing a virtualization layer. For example, in such embodiments, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In some embodiments, production DPA 108 may send its write transactions to replication DPA 126 using a variety of modes of transmission, such as continuous replication or snapshot replication. For example, in continuous replication, production DPA 108 may send each write transaction to storage 110 and also send each write transaction to replication DPA 126 to be replicated on storage 130. In snapshot replication, production DPA 108 may receive several I/O requests and combine them into an aggregate "snapshot" or "batch" of write activity performed to storage 110 in the multiple I/O requests, and may send the snapshot to replication DPA 126 for journaling and incorporation in target storage system 120. In such embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

Figure 2A:
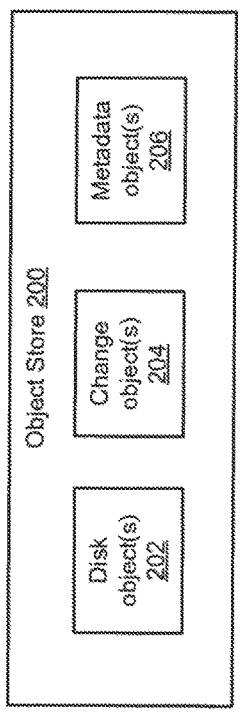
FIG. 2A is a block diagram of an object store of the data protection system of FIG. 1B, in accordance with an illustrative embodiment.

As shown in FIG. 2A, in some embodiments, a copy of a LUN or LU may be stored in an object store (e.g., object store 130' of FIG. 1B) of replication site 122'. Object store 130' may be implemented as shown in FIG. 2A, and may include a set of objects that may represent data of the LUN. For example, as shown in FIG. 2A, object store 200 may include one or more disk objects 202, one or more change objects 204 and one or more metadata objects 206. Disk objects 202 may include data stored in the LUN. As will be described, change objects may represent changes to data of the LUN over time. Metadata objects 206 may describe how a set of objects representing data of the LUN correspond to or may be used to create the LUN. In some embodiments, object store 200 may be in a cloud replication site. Replication may include sending objects representing changes to one or more LUNs on production site 102 to the replication site.

As described in regard to FIGS. 1A and 1B, input/output (I/O) requests sent to a LUN or LU (e.g., 112) on a production site (e.g., 102) may be intercepted by a splitter (e.g., 106). The splitter may send a copy of the I/O to a DPA (e.g., DPA 108). The DPA may accumulate multiple I/O into an object (e.g., disk objects 202). A change object (e.g., change objects 204) may refer to an object with accumulated I/O where each I/O may change data in the disk objects. The DPA may accumulate I/O until a certain size is reached, and may then send disk object(s) and change objects representing the accumulated I/O to a cloud replication site (e.g., 122) that may include an object store (e.g., 200). In some embodiments, DPA 108 may track metadata about changes corresponding to accumulated I/O in an object as metadata objects 206. DPA 108 may send metadata objects to a cloud or an object store when the metadata object reaches a certain size. In some embodiments, DPA 108 may package the disk objects, change objects and metadata objects into an object to send to a cloud replication site.

In described embodiments, as I/O occurs to the production site LUN, object store 200 may receive a set of change objects corresponding to the changes written to the LUN. In these embodiments, the object store may receive a set of metadata objects describing the changes to the LUN in the objects. Thus, the set of change objects and the set metadata objects may be used as a journal. In such embodiments, the metadata objects and one or more portions of the change objects may be used to create new disk objects to move the copy of the LUN to a different point in time. For example, by keeping the original set of metadata objects and objects, it may be possible to access the original LUN and any point in time (PIT). By reading the metadata objects describing the set of change objects, multiple PITs may be created on the cloud replication site. In some embodiments, objects and metadata may be maintained to provide a protection window of storage system 100. For example, a protection window may correspond to a time period during which changes to a LUN are tracked. Objects and metadata objects that correspond to a PIT outside of a protection window may be deleted.

Figure 2B:
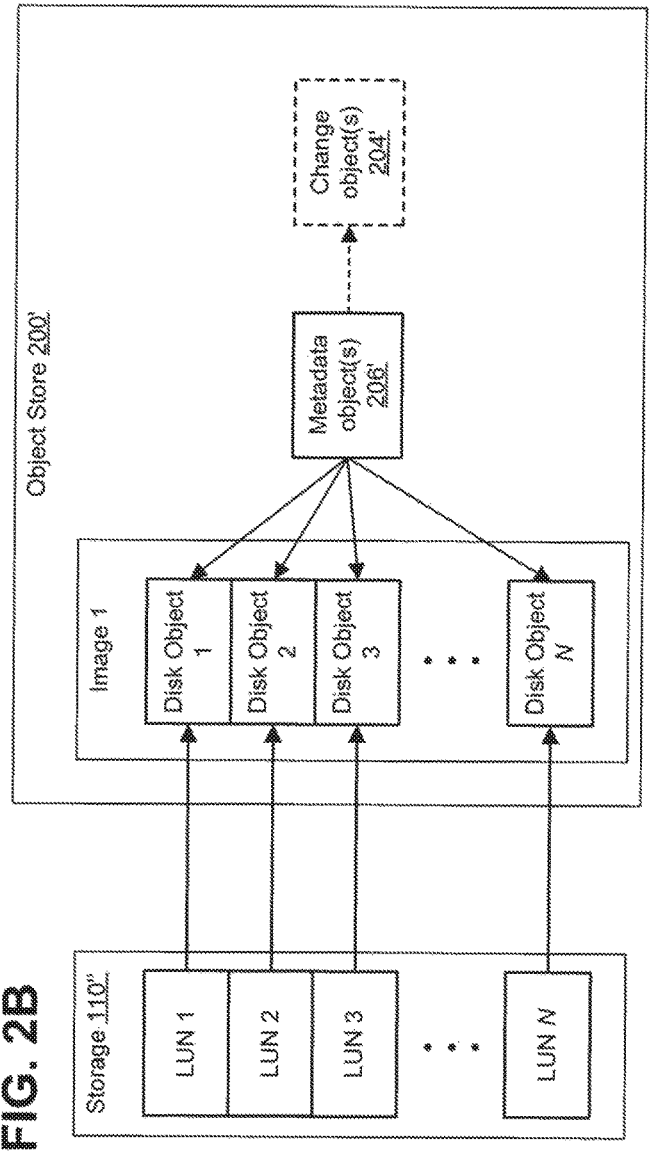
FIG. 2B is a block diagram showing an illustrative relationship between objects in the object store of FIG. 2A, in accordance with a second illustrative embodiment.

For example, referring to FIG. 2B, the relationship between the data objects of object store 200' and the LUNs of storage 110" are shown. As shown in FIG. 2B, at a first time, t1, image 1 of storage 110" may be generated. Image 1 includes a plurality of disk objects, shown as disk objects 1-N, each disk object corresponding to an associated LUN of storage 110", shown as LUNs 1-N. One or more metadata objects 206' may include information about each of the disk objects 1-N of image 1. As changes are made to the data stored in LUNs 1-N of storage 110" (e.g., in response to write requests), one or more change objects 204' may be stored in object store 200'. The change objects may include data or pointers to data that was modified from the data stored in disk objects 1-N of image 1. One or more metadata objects 206' may also include information about associations between change objects 204' and the disk objects 1-N of image 1 (e.g., if a given change object represents a change to a given disk object). As used in FIG. 2B, N represents a given number of objects, and may be an integer greater than or equal to 1.

Figure 2C:
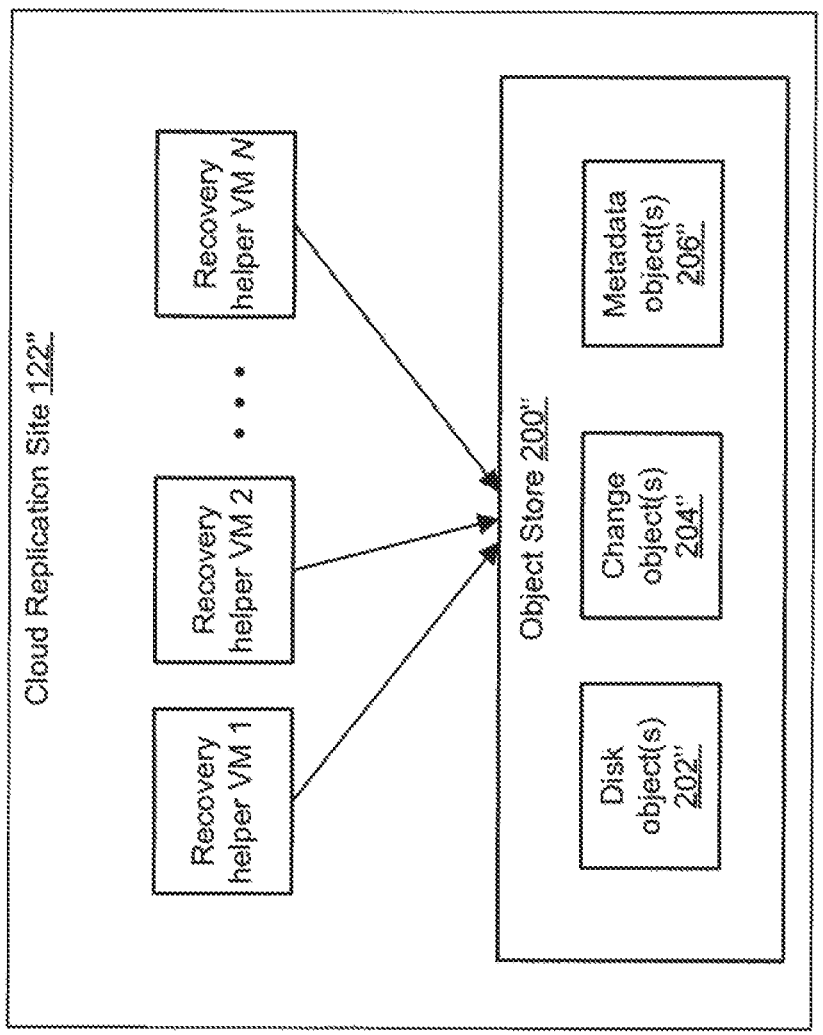
FIG. 2C is a block diagram showing recovery helper virtual machines in relation to the object store of FIG. 2A, in accordance with an illustrative embodiment.

Referring to FIG. 2C, an illustrative block diagram is shown of cloud replication site 122" having one or more recovery helper virtual machines (VMs), shown as recovery helper VMs 1-N. As described, one or more VMs may be generated to concurrently generate and test a plurality of PITs from the data stored in object store 200". As used herein, concurrently may refer to two or more things happening at the same time for some period of time, e.g., at least some overlap in time.

Figure 2D:
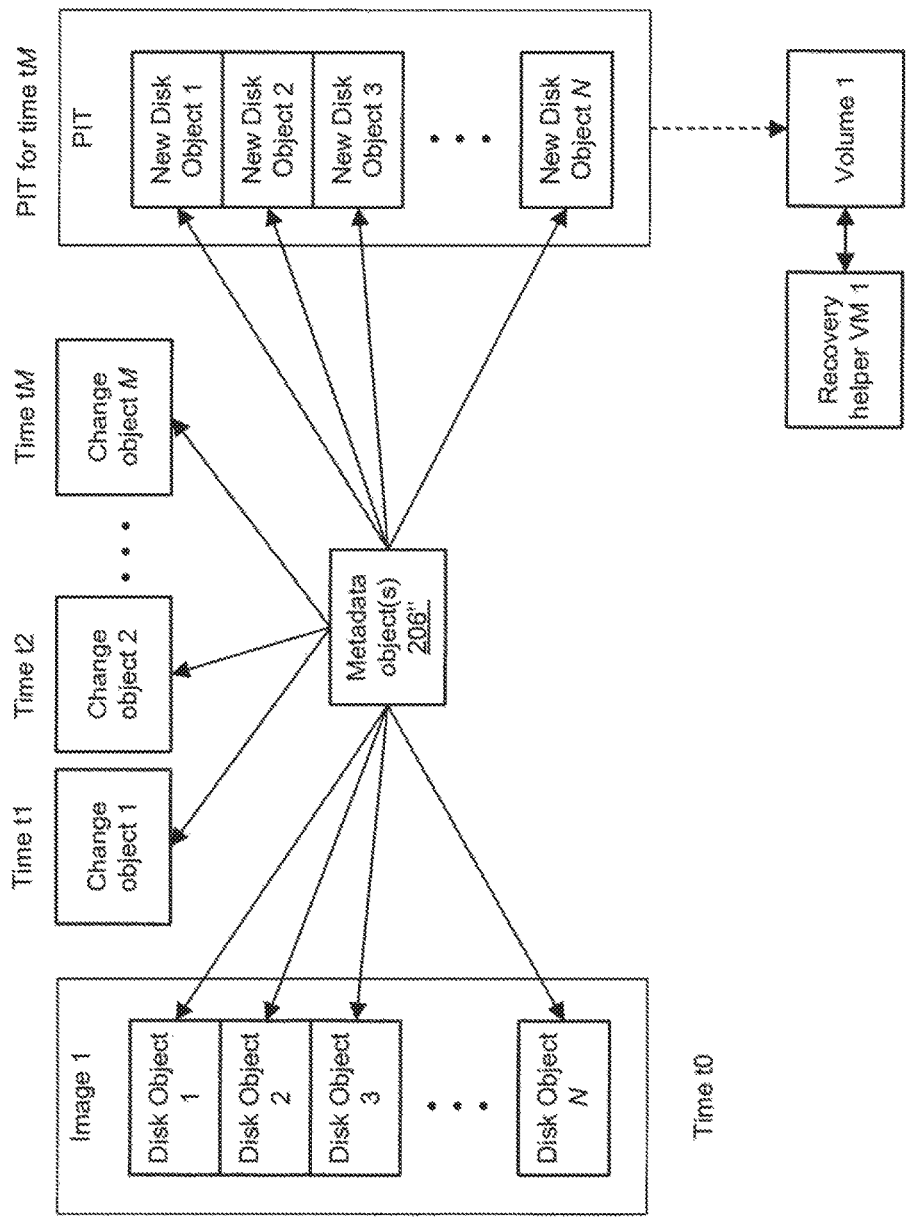
FIG. 2D is a block diagram showing an illustrative relationship between objects in the object store of FIG. 2A to generate points in time, in accordance with an illustrative embodiment.

Although shown in FIG. 2B as only including a single image (image 1), in general, object store 200' may include a plurality of images, with each image including full disk data (e.g., disk objects) of storage 110". For example, as shown in FIG. 2D, the images may be taken at specific time intervals, and between the image time intervals, one or more change objects 204' may allow recovery to various points in time between the image time intervals. For example, image 1 may be generated at time t0, and include full data (e.g., disk objects) of storage 110". Each change object 204' may correspond to changes that occurred at a specific time, shown as change objects 1-M, occurring at times t1-tM. By modifying an earlier image (e.g., image 1) with changes indicated in the one or more change objects, recovery can be made to a point in time between image intervals, shown as PIT for time tM. Metadata objects 206" may indicate the relationship between disk objects 1-N and change objects 1-M, which allow a new full disk image (e.g., new disk objects 1-N) to be generated to a given PIT. The PIT may then be copied to an associated volume, shown as volume 1, to be operated upon by an associated virtual machine, shown as recovery helper VM 1.

In some embodiments, one or more virtual machines may be used in the cloud or in the object store to process disk objects, change objects, and metadata objects describing the change objects to create a new PIT for a LUN. For example, the virtual machines may create new metadata objects to describe the LUN at a future point in time, where the new metadata objects may reference some of the original disk objects corresponding to the LUN and new objects that replace one or more of the original objects corresponding to the LUN.

In some embodiments, the virtual machines may be created (e.g., brought up) and run periodically to create new PITs for an object store or cloud containing changes to a copy of a LUN. If virtual machines operate periodically, there may not need to use compute power in the cloud (e.g., at the replication site) other than when the virtual machines are running. The virtual machines may process a set of change objects and a set of metadata objects to create a journal to enable a PIT to be rolled forward or backward in time. In some embodiments, the journal may be represented by a set of objects.

As described herein, a set of change objects that contain change data, and a set of metadata objects describing the change data may enable recovering or recreating the production site LUN from the replica data if a failure occurs on the production site.

Described embodiments may perform cloud recovery to multiple points in time (PITs). As described herein, storage system 100 may generate multiple snapshots of the replica copy of the LUN, each snapshot corresponding to a different PIT. Each snapshot may include one or more objects (e.g., as shown in FIG. 2) associated with LUNs of the snapshot. The objects may be used by replication site 122 to create a journal. By applying a portion of the journal (e.g., change objects) to disk data objects, multiple PITs may be recovered.

Storage system 100 may perform a recovery operation by initiating one or more virtual machines in the cloud (e.g., at the replication site) in parallel to apply journal data (e.g., change objects) to the volume data (e.g., disk objects). Thus, described embodiments may independently and simultaneously recover multiple PITs for quickly identifying/selecting a PIT for recovery (for example, the PIT with the most recent data before the production site disaster). When the PIT is selected, any redundant snapshots may be deleted to free additional storage space (e.g., in storage 132 of replication site 122).

Figure 3:
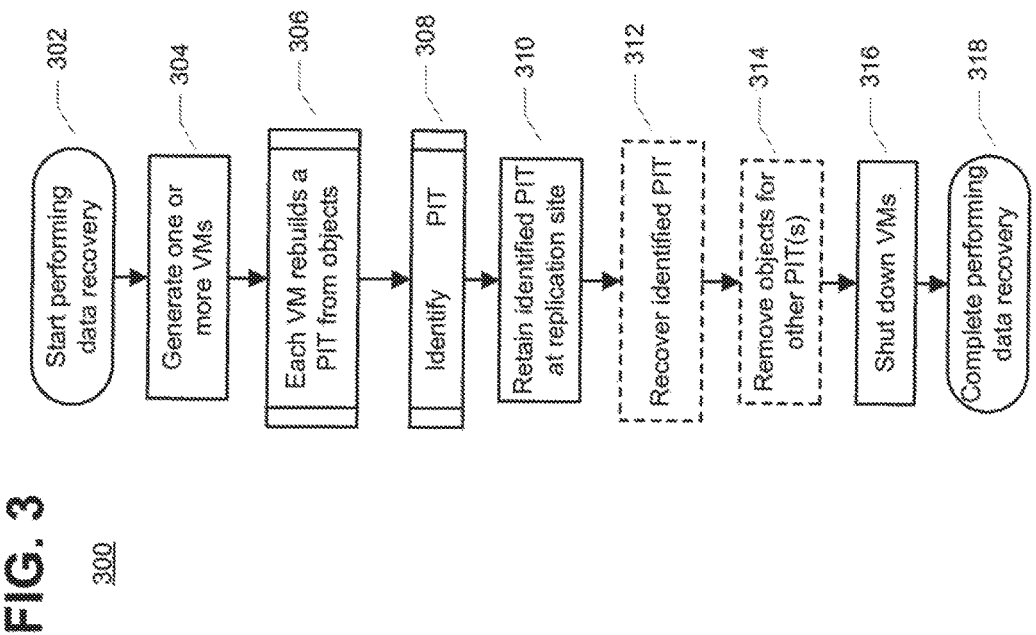
FIG. 3 is a flow diagram of a process to perform data recovery by the data protection system of FIGS. 1A and 1B, in accordance with an illustrative embodiment.

Referring to FIG. 3, a flow diagram of illustrative data recovery process 300 is shown. At block 302, data recovery process 300 begins. For example, data recovery process 300 may be started manually by a user of data protection system 100. Alternatively, data protection system 100 may automatically perform data recovery process 300, for example when production site 102 has experienced a data loss or disaster, or to periodically identify image data for a given PIT (e.g., identify a PIT). At block 304, one or more recovery helper virtual machines (VMs) are generated, for example at replication site 122. As described herein, replication site 122 may be a cloud site. At block 306, each of the VMs generated at block 304 rebuilds a corresponding PIT from data objects stored at replication site 122 (such as in object store 200 of FIG. 2A). Block 306 is described in greater detail in regard to FIG. 4.

At block 308, a PIT is identified from the PITs rebuilt at block 306. Block 308 is described in greater detail in regard to FIG. 5. At block 310, the identified PIT is retained at replication site 122. At block 312, data protection system 100 may optionally use the retained PIT to recover the data system to the PIT. For example, the retained PIT may be employed to allow recovery of production site 122 to the PIT, or to allow a new cloud site to be generated based upon the PIT. At block 314, data protection system 100 may optionally remove or delete objects for non-identified PITs. For example, as shown in FIG. 2A, one or more objects from object store 200, such as disk objects 202, change objects 204, and/or metadata objects 206, may be deleted if the objects are not needed for the identified/selected PIT, thus reducing the amount of data required to be stored at replication site 122. At block 316, the VMs generated at block 304 may be shut down, for example to reduce processor and memory consumption at replication site 122. At block 318, process 300 completes.

Figure 4:
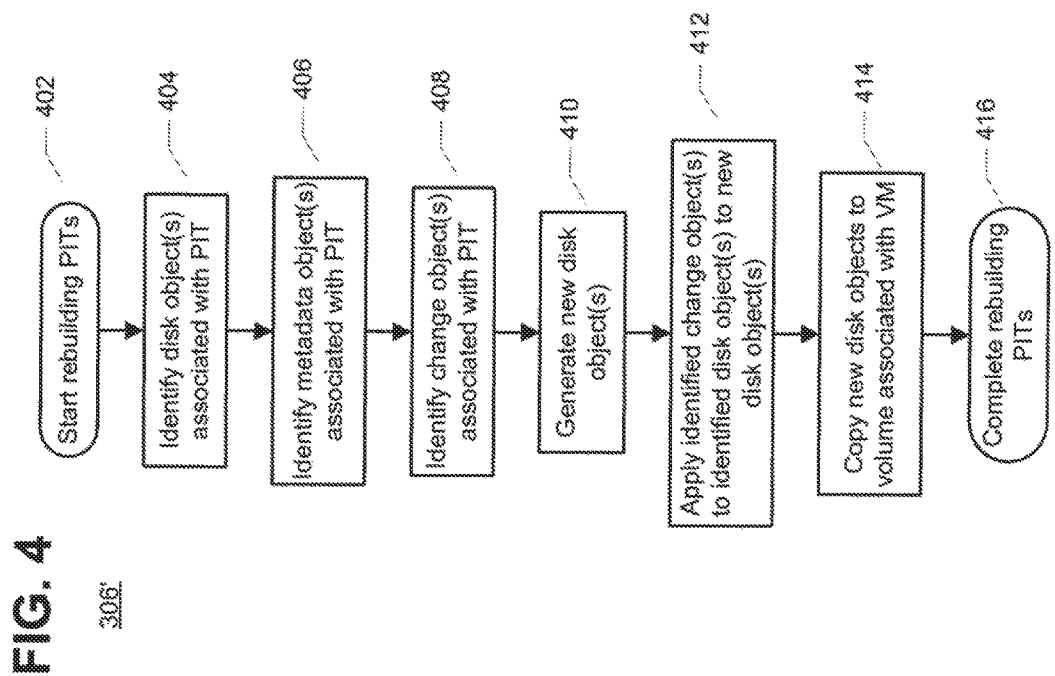
FIG. 4 is a flow diagram of a process to rebuild a point in time (PIT) by the data protection system of FIGS. 1A and 1B, in accordance with an illustrative embodiment.

Referring to FIG. 4, an illustrative process for block 306 of FIG. 3 is shown as PIT rebuilding process 306'. PIT rebuilding process 306' may be performed multiple times concurrently to rebuild multiple PITs. In some embodiments, each VM generated at block 304 may perform process 306' to rebuild an associated PIT. At block 402, process 306' starts. At block 404, the associated VM identifies one or more disk objects (e.g., disk objects 202 of FIG. 2A) that are associated with the PIT. For example, the VM may identify associated disk objects based upon a LUN associated with the PIT. At block 406, the associated VM identifies one or more metadata objects (e.g., metadata objects 206 of FIG. 2A) that are associated with the PIT. For example, the VM may identify associated metadata objects based upon the LUN associated with the PIT and the desired time associated with the PIT. At block 408, the associated VM identifies one or more change objects that are associated with the PIT. For example, the VM may identify associated change objects based upon the metadata objects identified at block 406 since the identified metadata objects may identify or otherwise reference any change objects associated with the PIT. In some embodiments, such as described in regard to FIG. 2D, change objects may be identified that include changes between a most recent full image of the LUN and a time associated with the PIT.

At block 410, the VM generates one or more new disk objects and, at block 412, applies data changes to generate data for the PIT, which is stored in the new disk objects. In other words, at block 412, the VM modifies data of the disk objects identified at block 404 with data from the change objects identified at block 408, and stores the modified data in the new disk objects generated at block 410. At block 414, the new disk objects are copied to a volume that is associated with the VM. At block 416, process 306' completes.

Figure 5:
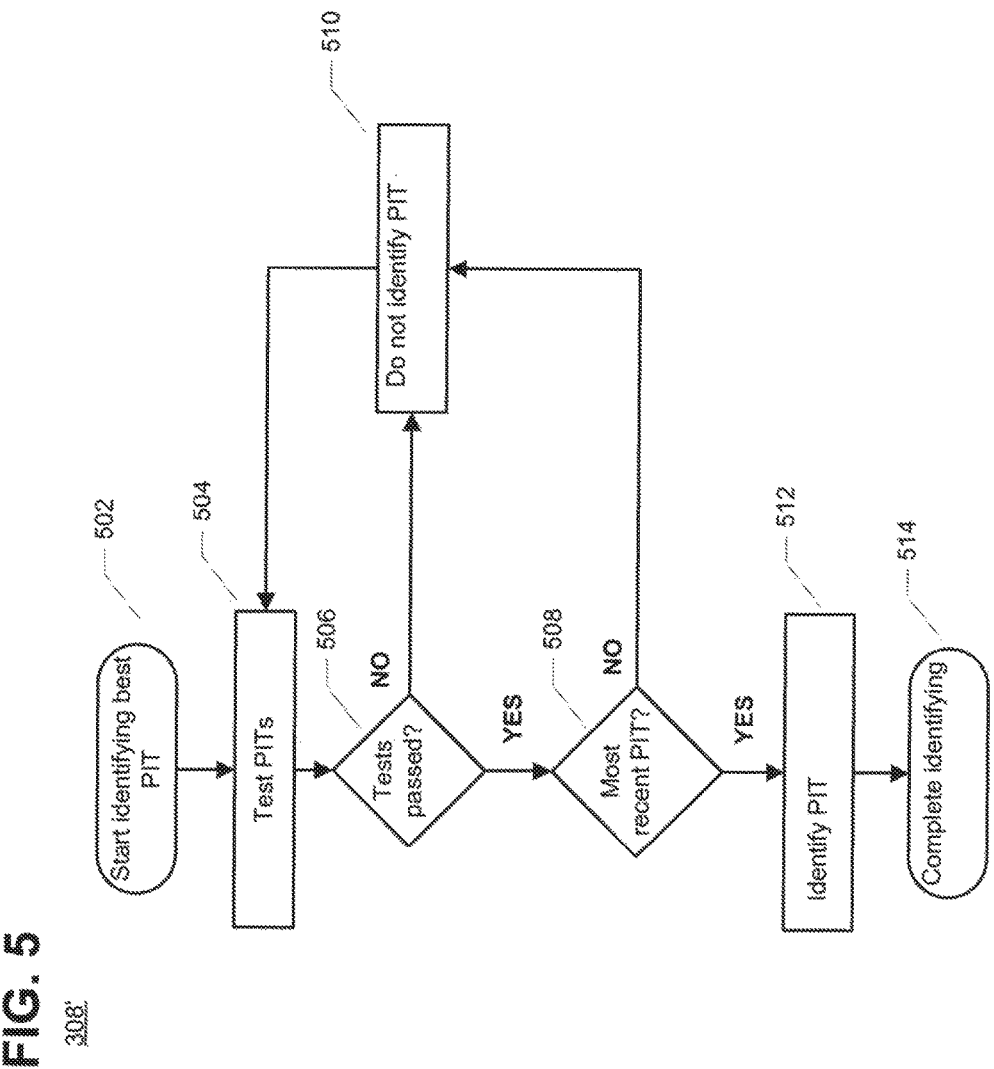
FIG. 5 is a flow diagram of a process to select a PIT by the data protection system of FIGS. 1A and 1B, in accordance with an illustrative embodiment.

Referring to FIG. 5, an illustrative process for block 308 of FIG. 3 is shown as PIT identifying process 308'. PIT identifying process 308' may be performed multiple times concurrently to quickly test a plurality of PITs and identify at least one PIT. In some embodiments, each VM generated at block 304 may perform process 308' to test an associated PIT. At block 502, process 308' starts. At block 504, each generated PIT (e.g., each PIT generated at block 306 of FIG. 3) is tested. In some embodiments, one or more various tests may be performed on each PIT. In some embodiments, the type of test may be based upon a type of disaster that occurred at production site 102. For example, if production site 102 experienced a virus, a virus scan may be performed on each PIT to determine a most recent PIT that does not have the virus. As a further example, if production site 102 experienced a data corruption (e.g., one or more LUNs or other data structures or tables becoming invalid or otherwise corrupt), a test may be performed on each PIT to determine a most recent PIT that has valid, uncorrupted data. Other tests may also be possible, such as searching for the availability of specific files, application-specific tests, database tests, or other tests. In some embodiments, a different PIT may be identified based upon characteristics of the PIT. For example, it may be desired to provide a given PIT to a given user of data protection system 100, while other users may receive other PITs. As another example, a given PIT may be selected as the PIT for a given type of use of the PIT. For example, a first PIT may be selected as the PIT for operating a cloud VM, while another PIT may be selected as the PIT for rolling back production site 102, while yet another PIT may be selected as the PIT for testing purposes.

At block 506, if the tests performed at block 504 are acceptable (e.g., the tests have passed), and at block 508 the PIT is the most recent PIT (e.g., the most recent PIT in relation to a desired time of interest, such as the time of a disaster or data loss at production site 102), then at block 512, the PIT is selected. If, at block 506, a test did not pass, or at block 508, a PIT is not the most recent PIT before the time of interest, then at block 510, the PIT is not identified as the preferred PIT. Once a PIT is identified at block 512, process 308' completes at block 514.

Thus, as shown in FIGS. 2A-D, 3, 4 and 5, a given point in time can be generated based upon data objects. Given embodiments may generate a new VM with an associated empty volume in the cloud (e.g., at cloud replication site 122'). Data may be copied from one or more objects (e.g., one or more disk objects and zero or more change objects) into the volume associated with the VM. The VM is run and various tests may be performed on the VM and/or the data copied into the volume, for example to identify a PIT. Thus, as described herein, some embodiments may test multiple PITs in parallel at a cloud site to identify one or more PITs, for example depending on at least one of a type of use and an identified user of the PIT.

Figure 6:
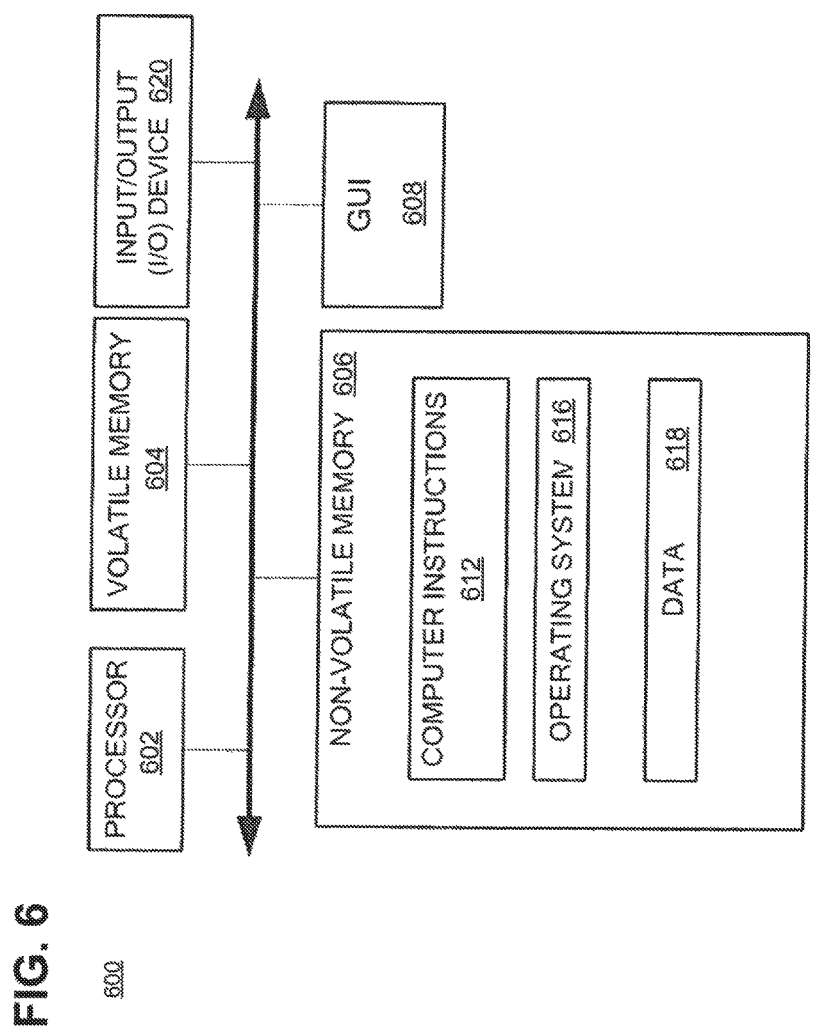
FIG. 6 is a block diagram of an example of a hardware device that may perform at least a portion of the processes in FIGS. 4-5.

In some described embodiments, production site 102 and/or replication site 122 of FIGS. 1A and 1B may each correspond to one computer, a plurality of computers, or a network of distributed computers. For example, in some embodiments, production site 102 and/or replication site 122 may be implemented as one or more computers such as shown in FIG. 6. As shown in FIG. 6, computer 600 may include processor 602, volatile memory 604 (e.g., RAM), non-volatile memory 606 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604 to perform at least a portion of the processes described herein. Program code may be applied to data entered using an input device of GUI 608 or received from I/O device 620.

The processes described herein are not limited to use with the hardware and software of FIG. 6 and may find applicability in any computing or processing environment and with any type of machine or set of machines that may be capable of running a computer program. The processes described herein may be implemented in hardware, software, or a combination of the two.

The processes described herein are not limited to the specific embodiments described. For example, processes are not limited to the specific processing order shown described herein. Rather, any of the blocks of the processes may be re-ordered, combined or removed, performed in parallel or in serial, as necessary, to achieve the results set forth herein.

Processor 602 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A storage system comprising:
    a replication site configured to communicate with a production site;
    an object store located at the replication site, the object store storing data objects associated with data stored in storage of the production site;
    the replication site configured to:
        generate a plurality of points in time (PITs) from the data objects; and
        generate a plurality of virtual machines;
        copy each of the generated plurality of PITs to a volume associated with one of the virtual machines;
        test the plurality of pits, wherein at least some of the plurality of PITs are tested concurrently; and
        select a PIT from the plurality of PITs based on an outcome of the test.

2. The system of claim 1, Wherein the data objects comprise (i) a set of disk objects associated with data stored in a copy of a logical unit or virtual disk at a point in time of the production site, (ii) a set of change objects associated with one or more input/output (I/O) operations on the production site, and (iii) a set of metadata objects associated with the set of change objects.

3. The system of claim 2, wherein the replication site is configured to generate the plurality of PITs by identifying, based at least in part upon the set of metadata objects: (i) one or more disk objects associated with the PIT, and (ii) one or more change objects associated with the PIT.

4. The system of claim 3, wherein, to generate each PIT, the replication site is configured to:
    generate one or more new disk objects;
    generate new data by applying the identified one or more change objects to the identified one or more disk objects; and
    store the new data to the one or more new disk objects.

5. The system of claim 1, wherein to test each PIT, the replication site is configured to identify a most recent valid PIT in relation to a time of interest.

6. The system of claim 1, wherein to test each PIT, the replication site is configured to, at least one of, validate data of the PIT and scan data of the PIT for malicious software code.

7. The system of claim 1, wherein the replication site is configured to provide the identified PIT to at least one of the production site and a cloud-based virtual machine.

8. The system of claim 1, wherein the replication site is further configured to delete data objects associated with non-identified ones of the plurality of PITs.

9. The system of claim 1, wherein the replication site is configured to identify two or more PITs from the plurality of PITs, and provide each identified PIT to an associated identified user of the storage system.

10. The system of claim 1, wherein PIT is selected concurrently with generating the plurality of PITs.

11. A method for operating a storage system comprising:
generating an object store located at a cloud replication site, the object store storing data objects associated with data stored in storage of a production site;
generating a plurality of points in time (PITs) from the data objects;
generating a plurality of virtual machines;
copying each of the generated plurality of PITs to a volume associated with one of the virtual machines;
testing the plurality of pits, at least some of the plurality of pits being tested concurrently; and
identifying a PIT from the plurality of PITs based on an outcome of the testing.

12. The method of claim 11, wherein the data objects comprise (i) a set of disk objects associated with data stored in a copy of a logical unit or virtual disk at a point in time of the production site, (ii) a set of change objects associated with one or more input/output (I/O) operations on the production site, and (iii) a set of metadata objects associated with the set of change objects, the method further comprising generating the plurality of PITs by identifying, based at least in part upon the set of metadata objects: (i) one or more disk objects associated with the PIT, and (ii) one or more change objects associated with the PIT.

13. The method of claim 12, wherein generating each PIT comprises:
generating one or more new disk objects;
generating new data by applying the identified one or more change objects to the identified one or more disk objects; and
storing the new data to the one or more new disk objects.

14. The method of claim 11,
wherein testing any of the PITs comprises at least one of: validating data of the PIT, scanning data of the PIT for malicious software code, and identifying a most recent valid PIT in relation to a time of interest.

15. The method of claim 11, further comprising:
providing the identified PIT to at least one of: the production site and a cloud-based virtual machine; and
deleting data objects associated with non-identified ones of the plurality of PITs.

16. The method of claim 11, further comprising identifying two or more PITs from the plurality of PITs, and providing each identified PIT to an associated identified user of the storage system.

17. A computer program product including a non-transitory computer readable storage medium having computer program code encoded thereon that when executed on a processor of a computer causes the computer to operate a storage system, the computer program product comprising:
computer program code for generating an object store located at a cloud replication site, the object store storing data objects associated with data stored in storage of a production site;
computer program code for generating a plurality of points in time (PITs) from the data objects; and
computer program code for generating a plurality of virtual machines;
computer program code for copying each of the generated plurality of PITs to a volume associated with one of the virtual machines;
computer program code for testing each PIT, at least some of the PITs being tested concurrently; and
computer program code for identifying a PIT from the plurality of PITs based on an outcome of the testing.

18. The computer program product of claim 17, wherein the data objects comprise (i) a set of disk objects associated with data stored in a copy of a logical unit or virtual disk at a point in time of the production site, (ii) a set of change objects associated with one or more input/output (I/O) operations on the production site, and (iii) a set of metadata objects associated with the set of change objects, the computer program product further comprising computer program code for generating the plurality of PITs by identifying, based at least in part upon the set of metadata objects: (i) one or more disk objects associated with the PIT, and (ii) one or more change objects associated with the PIT.

19. The computer program product of claim 18, further comprising:
computer program code for generating one or more new disk objects;
computer program code for generating new data by applying the identified one or more change objects to the identified one or more disk objects;
computer program code for storing the new data to the one or more new disk objects;
wherein testing each PIT comprises at least one of: validating data of the PIT, scanning data of the PIT for malicious software code, and identifying a most recent valid PIT in relation to a time of interest.

* * * * *